United States Patent [19]

Schneider

[11] 4,041,213

[45] Aug. 9, 1977

[54] POWER CELL COMPARTMENT FOR AN ELECTRICALLY ENERGIZED TIMEPIECE

[75] Inventor: Henri Schneider, Mont Soleil, Switzerland

[73] Assignee: Societe Suisse Pour l'Industrie Horlogere Management Services S.A., Bienne, Switzerland

[21] Appl. No.: 697,665

[22] Filed: June 18, 1976

[30] Foreign Application Priority Data

June 30, 1975 United Kingdom ............. 27512/75

[51] Int. Cl.[2] ............................................ H01M 2/06

[52] U.S. Cl. ................................ 429/98; 58/23 BA

[58] Field of Search .......................... 429/96, 98, 100; 58/23 BA

[56] References Cited

U.S. PATENT DOCUMENTS 3,856,577 12/1974 Oki et al. ............................ 429/96

FOREIGN PATENT DOCUMENTS 2,260,588 12/1972 Germany ......................... 58/23 BA

*Primary Examiner*—Donald L. Walton

*Attorney, Agent, or Firm*—Griffin, Branigan and Butler

[57] ABSTRACT

In an electrically energized timepiece, an anisotropically conductive elastomer is fixed to the timepiece casing to provide a mechanical seal between the movement compartment and power cell. With slight pressure of the elastomer between the power cell and timepiece contacts, an electrical connection is made between the power cell and contacts, but the elastomer acts as an insulator along its surface between timepiece contacts.

4 Claims, 1 Drawing Figure

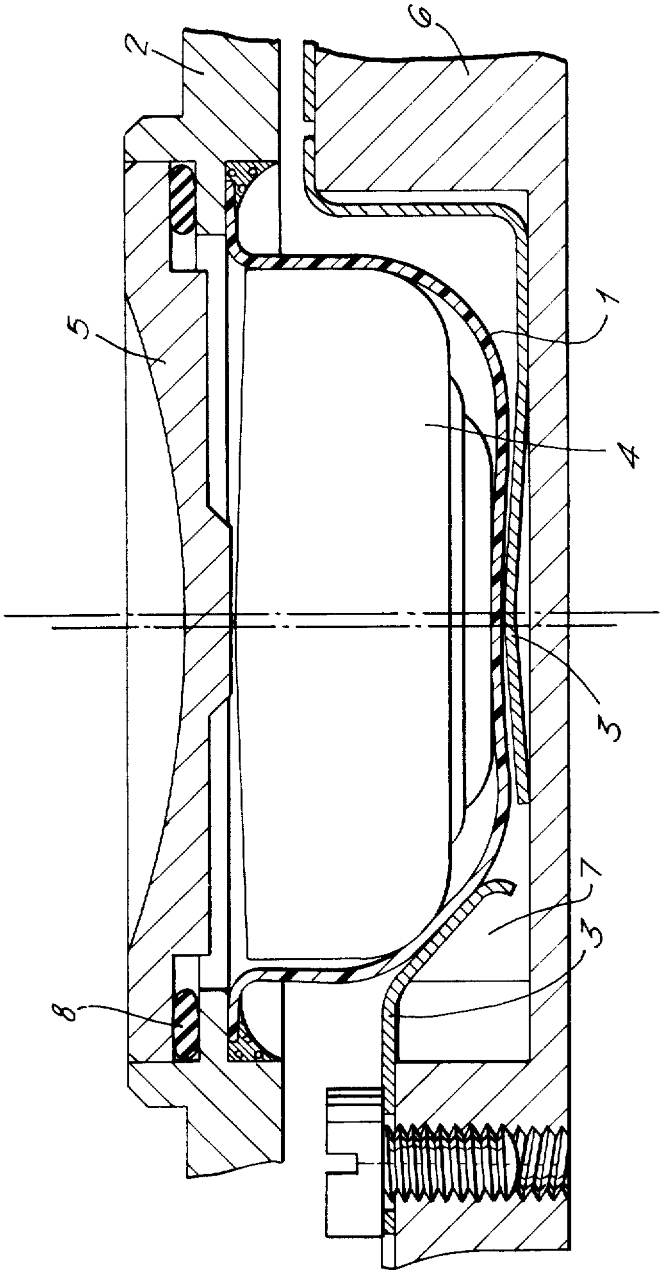
2
6
1
5
4
3
7
3
8

POWER CELL COMPARTMENT FOR AN ELECTRICALLY ENERGIZED TIMEPIECE

The present invention concerns an electrically energized timepiece and more particularly one which, being in the form of a wrist watch or similar instrument, is energized by means of one or more button type energy cells. Such cells may comprise so-called dry cells and it is understood that the energy cells may likewise include rechargeable accumulators.

At least in the case of dry cells it is known that at present it is necessary to replace these periodically and although the intervals between replacements tend to increase with the advances in the technology, nevertheless replacements are normally required at intervals from one year to 18 months. For most users of such timepieces such replacement requires a trip to the watchmaker or jeweller in order to effect such replacement since otherwise difficulties are likely to be experienced with properly resealing the timepiece casing.

Much effort and thought has gone into the problem of how to overcome the difficulties associated with this seemingly simple replacement operation so that the user could attend to the matter himself in a sure fashion without requiring recourse to the watch dealer. It will be realized moreover that with the increasing popularity of electrically energized timepieces the problem is one which is steadily increasing its dimensions whereby it is foreseeable that a substantial amount of time may eventually have to be devoted simply to replacing timepiece energy cells.

It is with this problem in mind that the present invention seeks to enable replacement of the energy cell by the user without difficulty and without in any way risking the seals which assure impermeability between the exterior and the compartment which houses the timepiece movement.

Although as previously indicated the problem has occupied a great deal of thought, none the less the solutions so far proposed have all been either too complex and costly or have failed to satisfy the basic requirement of a foolproof impermeable power cell enclosure which while reliably ensuring proper electrical contact will nevertheless enable the user to replace the power cell without in any way disturbing mechanical seals.

To this end the invention provides a power cell compartment for an electrically energized timepiece wherein an envelope formed from an anisotropically conductive elastomer partially encloses the power cell and is fixed to the timepiece casing so as to provide a mechanical seal between the movement compartment and the power cell compartment and to assure electrical connection between the movement contacts and the power cell electrodes.

For a better understanding of the invention reference will now be made to the accompanying drawing.

Herein is shown a support plate 6 for an electrically energized watch movement (not shown). Within such support plate is to be found a cut-out portion 7 adapted so as to be suitable to accomodate a power cell 4 of the dimensions suitable for the watch movement in question. Within the cut-out portion are mounted electrical contacts 3 which are placed so as to be proximate the electrodes of the power cell 4. Normally, with the power cell in place the electrodes thereof would be contacted by contacts 3 thereby to provide an electrically conductive path to the movement.

Between contacts 3, the surface of the power cell 4 and its electrodes is placed an envelope 1. Such envelope will partially enclose the power cell except for the portion by which it is retained within the compartment by means of the cover 5.

Envelope 1 is formed of an conductive elastomeric material such as that set forth in U.S. Pat. No. 3,883,213 to Glaister. In addition to presenting a good mechanical impermeability property is electrically conductive in a highly anisotropic manner. Thus when placed between a pair of facing contacts the electrical resistance of thicknesses ranging between 0.010 and 0.020 inches will be in the order of less than one ohm as soon as slight pressure is applied. On the other hand resistance between two points on the same surface, even when placed together a distance almost as small as the thickness, will exceed hundreds of megaohms.

Accordingly, the placing of the power cell 4 within such an envelope 1 will enable the proper electrical contact to exist between such power cell and the circuits of the timepiece while assuring that none the less the power cell electrodes continue to be electrically insulated from one another.

The envelope 1 may be fastened to the interior of the watch case at any location suitable in respect of the location of the power cell compartment. The fastening may be effected by means of glueing or by any other suitable manner such as through use of a press fitted retaining ring or a screw threaded retaining ring 2. When the power cell is in place the compartment may be sealed by means of a cover member 5 and if desired a sealing ring 8.

It will thus be clear that removal of the cover member 5 merely permits access to the power cell itself and that no access to the movement compartment is provided. Thus to replace the power cell it is merely necessary to remove cover 5, shake out the old power cell and replace it with a new one thereafter replacing the cover. Since no seals have been broken there is no need to be concerned about replacing seals in order to assure continuing impermeability. At the same time this power cell compartment provides an added measure of security in the event that there should be any leakage in the power cell itself. It is clear that even should it be necessary in such event to replace the elastomer element 1 this will be far less costly than the replacement of a partially destroyed movement.

In practice it has been found advantageous from a manufacturing standpoint that the useful anisotropic properties of the elastomer element 1 be confined substantially to the bottom portion thereof. Thus it is preferred that the movement contacts be arranged as shown in the drawing wherein one such contact is adjacent the center contact of the power cell and the other is adjacent the curved wall of the power cell in proximity to the center contact.

What I claim is:

1. Power cell compartment for an electrically energized timepiece wherein an envelope formed from an anisotropically conductive elastomer partially encloses the power cell and is fixed to the timepiece casing so as to provide a mechanical seal between the movement compartment and the power cell compartment and to assure electrical connection between the movement contacts and the power cell electrodes.

2. Power cell compartment as set forth in claim 1 wherein the envelope is a good conductor of electricity across its wall thickness and a good insulator along its surfaces in regions where the movement contacts and power cell electrodes are proximate one another.

3. Power cell compartment as set forth in claim 1 wherein the envelope is attached to the timepiece casing and is free of the movement.

4. Power cell compartment as set forth in claim 3 wherein a cover member is provided in the timepiece casing and is arranged and adapted to seal the power cell compartment and to permit access to the power cell.

* * * * *